United States Patent
Fellows

(10) Patent No.: US 12,326,291 B2
(45) Date of Patent: Jun. 10, 2025

(54) SYSTEMS AND METHODS RELATING TO REFRIGERATED PACKAGING

(71) Applicant: JACE Sciences, LLC, Dover, DE (US)

(72) Inventor: Justin Andrew Fellows, Phoenix, AZ (US)

(73) Assignee: JACE Sciences, LLC, Phoenix, AZ (US)

( * ) Notice: Subject to any disclaimer, the term of this patent is extended or adjusted under 35 U.S.C. 154(b) by 0 days.

(21) Appl. No.: 18/528,580

(22) Filed: Dec. 4, 2023

(65) Prior Publication Data
US 2024/0335818 A1  Oct. 10, 2024

Related U.S. Application Data

(60) Provisional application No. 63/457,304, filed on Apr. 5, 2023.

(51) Int. Cl.
*F25D 11/00* (2006.01)
*B01J 20/26* (2006.01)
(Continued)

(52) U.S. Cl.
CPC .......... *F25D 11/003* (2013.01); *B01J 20/261* (2013.01); *B01J 20/2803* (2013.01);
(Continued)

(58) Field of Classification Search
CPC ................ B01J 20/28047; B01J 20/261; B01J 20/2803; B01J 20/3021; B01J 20/3078
See application file for complete search history.

(56) References Cited

U.S. PATENT DOCUMENTS 3,002,960 A  10/1961  Kolodny
3,131,076 A   4/1964  Richardson
(Continued)

FOREIGN PATENT DOCUMENTS

CA  2072867   5/2005
CA  2460152  10/2009
(Continued)

OTHER PUBLICATIONS

Machine translation of KR-20160081382-A (Year: 2016).*
(Continued)

*Primary Examiner* — Sally A Merkling
*Assistant Examiner* — Logan Edward Laclair
(74) *Attorney, Agent, or Firm* — The Lisa Foundation Patent Law Clinic; Spencer Kirkham

(57) ABSTRACT

A system and method for refrigerated packaging and temperature modulation is disclosed. A unique hydrogel formulation comprising a superabsorbent polymer functioning through osmosis, water-soluble binding agent, wicking agent, and an osmosis interfering agent allows a package to be cooled by regular ice without the product or container becoming wet as the ice melts. Hydrogels may be shaped into a container with ice and products placed inside of it. Several additives may be added to the hydrogel formulation to give, remove, or enhance certain properties. A number of additional applications of the inventions are disclosed including agricultural, structural cooling, home and beauty, athletic, medical, work, and other applications.

20 Claims, 5 Drawing Sheets

(51) Int. Cl.
   *B01J 20/28* (2006.01)
   *B01J 20/30* (2006.01)
   *F25D 29/00* (2006.01)

(52) U.S. Cl.
   CPC ..... *B01J 20/28047* (2013.01); *B01J 20/3021* (2013.01); *B01J 20/3078* (2013.01); *F25D 29/005* (2013.01); *F25D 2600/06* (2013.01)

(56) References Cited

U.S. PATENT DOCUMENTS

| | | | |
|---|---|---|---|
| 4,295,987 | A | 10/1981 | Parks |
| 5,415,649 | A | 5/1995 | Watanabe |
| 7,163,966 | B2 | 1/2007 | Joy |
| 8,802,786 | B2 | 8/2014 | Shi |
| 2021/0038439 | A1 * | 2/2021 | Torii ................. A61F 13/15617 |

FOREIGN PATENT DOCUMENTS

| | | | | |
|---|---|---|---|---|
| CN | 111422498 | A * | 7/2020 | ........... B65D 65/466 |
| KR | 20160081382 | A * | 7/2016 | |
| WO | 2005108472 | A1 | 11/2005 | |
| WO | WO-2000052112 | A1 * | 4/2020 | |

OTHER PUBLICATIONS

Machine translation of CN-111422498-A (Year: 2020).*
Machine translation of WO-2000052112-A1 (Year: 2020).*
Peli Biothermal, NanoCool Evaporative Cooling, webpage https://pelibiothermal.com/nanocool, accessed Sep. 5, 2023.
Creative Packaging Company, Packaging, webpage https://creativepackagingco.com/product-category/packaging/, accessed Sep. 5, 2023.
Insulated Products Corp, Full Product Selection, webpage https://ipcpack.com/products/, accessed Sep. 5, 2023.
Cold Chain Technologies, Products and Solutions, webpage https://www.coldchaintech.com/products-solutions, accessed Sep. 5, 2023.
UPS, Cold Chain Packaging, webpage https://www.ups.com/us/en/healthcare/solutions/cold-chain-packaging.page, accessed Sep. 5, 2023.
Fedex, Refrigerated and Cold Shipping, webpage https://www.fedex.com/en-us/shipping/temperature-control/refrigerated-cold-shipping.html, accessed Sep. 5, 2023.
Intelsius, Temperature-Controlled Packaging Guide, webpage https://intelsius.com/temperature-controlled-packaging-guide/, accessed Sep. 5, 2023.
Nordic Cold Chain Solutions, Cold Chain Products, webpage https://nordiccoldchain.com/products/, accessed Sep. 5, 2023.
Cryopak, Cold Chain Packaging, webpage https://www.cryopak.com/cold-chain-packaging/, accessed Sep. 5, 2023.
TPC Packaging Solutions, Cold Chain/Temperature Controlled Packaging, webpage https://tpcpack.com/products/packaging/cold-chain-temperature-controlled-packaging/, accessed Sep. 5, 2023.
Sonoco Thermosafe, Parcel Solutions, webpage https://www.thermosafe.com/products/pre-qualified-solutions/parcel-solutions/, accessed Sep. 5, 2023.
Sealedair, Cold Chain Solutions, webpage https://www.sealedair.com/solutions/healthcare-medical/cold-chain-vaccine-shippers, accessed Sep. 5, 2023.
Softbox Systems, Temperature Controlled Shipping Solutions, webpage https://www.softboxsystems.com/us/, accessed Sep. 5, 2023.
Tempack, About Tempack, webpage https://tempack.com/about-tempack/, accessed Sep. 5, 2023.
Ehab Al-Emam, Hilde Soenen, Joost Caen & Koen Janssens, Characterization of polyvinyl alcohol-borax/agarose (PVA-B/AG) double network hydrogel utilized for the cleaning of works of art, Research Article, Oct. 21, 2020, Heritage Science 8 Article No. 106.
Gore-Tex, Gore-Tex Waterproof Products, webpage https://www.gore-tex.com/technologies/outerwear, accessed Sep. 5, 2023.
Dupont Tyvek, Tyvek Forward Together, webpage https://www.dupont.com/brands/tyvek.html, accessed Sep. 5, 2023.

* cited by examiner

FIG. 4
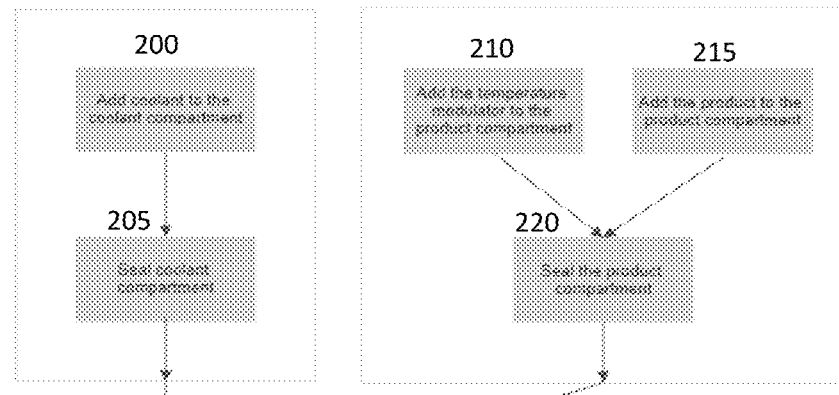
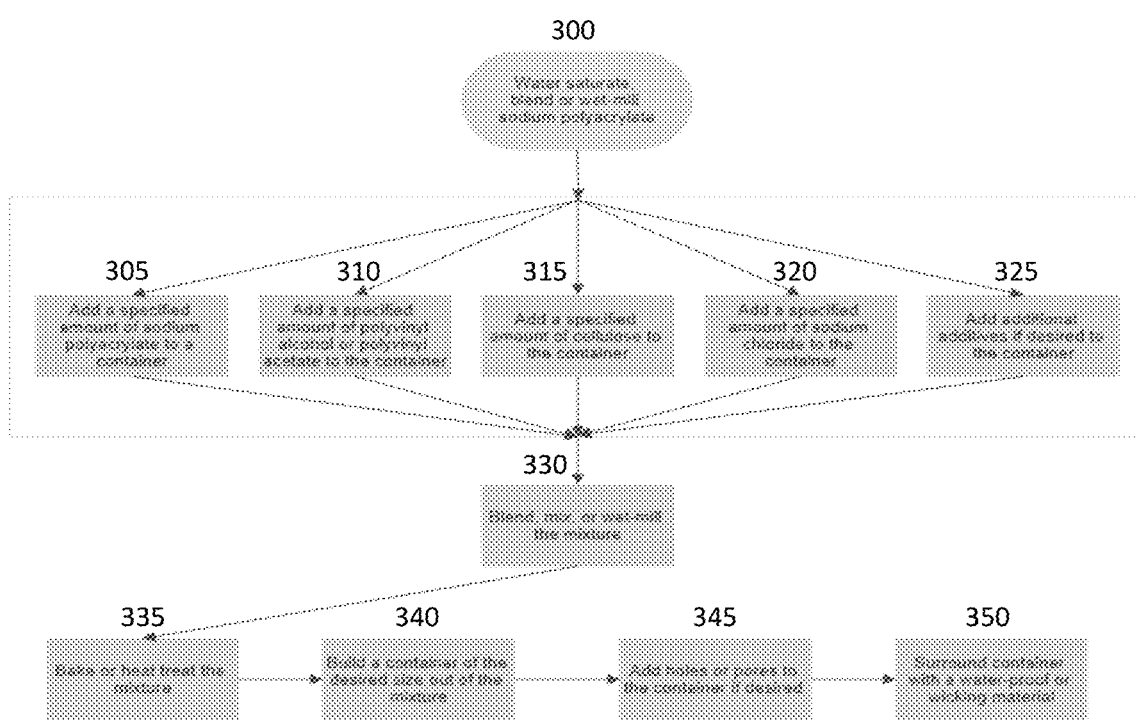
FIG. 5

FIG. 6
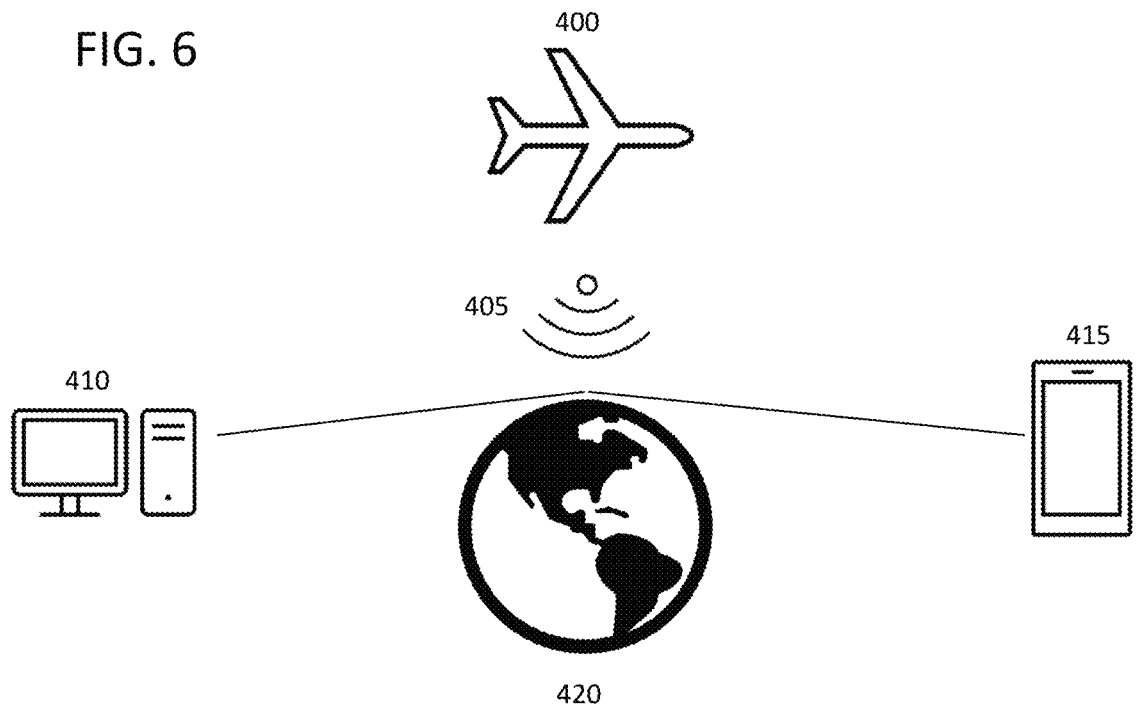
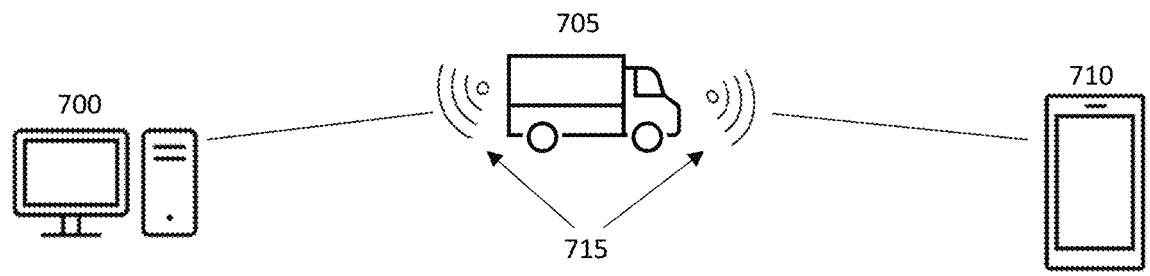
FIG. 7

SYSTEMS AND METHODS RELATING TO REFRIGERATED PACKAGING

CROSS REFERENCE TO RELATED APPLICATIONS

Priority is claimed to U.S. Provisional Appl. No. 63/457,304, which is incorporated by reference herein in its entirety.

BACKGROUND

The inventions described herein generally pertain to, among other things, shipping logistics and thermally controlled packaging.

Businesses and organizations around the world ship products and materials at variously controlled temperatures. Failure to maintain controlled temperatures may result in food that becomes unsafe for consumption, medicine with reduced efficacy or safety, costs incurred by product waste, and a variety of other negative outcomes. Effective temperature controls for shipped products often consume excessive energy and see high costs.

In some instances, products are put on a refrigerated truck for delivery to a refrigerated warehouse or grocery store near the final location. Products are handed off to last mile logistics companies, which are often equipped with reflective foil lined bags for temperature regulation.

In some instances, gel ice packs and insulation may regulate temperature. Cold chain logistics are often expensive for shipping. An alternative is to use shipping organizations such as the U.S. postal service. In such instances, products may be packaged adequately to stay cold for 2-3 days if shipping to the mainland United States or 4-5 days for Hawaii, Alaska, or internationally. Gel ice packs may be beneficial because they can be self-contained, and may include expanded polystyrene foam or foil-lined bubble wrap as insulation. A product seller may purchase insulation and gel ice packs and pay for shipping. The customer becomes responsible for disposing of a large amount of packaging trash.

In some instances, dry ice may be used. Dry ice may be used to ship frozen items. However, dry ice can be problematic when shipping anything that may be damaged by freezing. Without temperature regulation, the package temperature can fluctuate due to the large difference in ambient temperature outside of the package and the temperature of dry ice.

In some instances, a shipper could use NanoCool™ by Path-Tec™. This technology uses pre-made vacuum tubes to lower the evaporation point of water, thereby forcing cooling by evaporation. This packaging can potentially maintain temperatures for extended periods of time. However, it can be cost prohibitive at an average cost of over $100 just for the box, before shipping costs.

SUMMARY OF THE INVENTIONS

The present inventions relate to, among other things, novel and unique packaging systems configured to maintain refrigerated temperatures (e.g., approximately −109 to 46 F) for 72+ hours.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the detailed description and drawings, and from the claims.

It may be an object of some of the inventions to provide better, cheaper, and more efficient methods, devices, or systems for shipping temperature sensitive contents.

It may be an object of some of the inventions to enhance food or beverage safety.

It may be an object of some of the inventions to enhance medication safety.

It may be an object of some of the inventions to reduce fossil fuel emissions and transportation costs.

It may be an object of some of the inventions to enable developing countries to access cold chain logistics.

The inventions may include a hydrogel which may have a formulation of 10-40% by dry weight, superabsorbent polymer; 5-25% by dry weight, water-soluble binding agent; 50-80% by dry weight, wicking agent; and <1% by dry weight, osmosis interfering agent. The osmosis interfering agent may be sodium chloride. The superabsorbent polymer may be sodium polyacrylate. The water-soluble binding agent may be polyvinyl alcohol. The wicking agent may be cellulose. A number of additives may be included in the formulation depending on desired properties, such as a refractive or reflective material with >90% reflectivity, a phosphor or fluorescent material, a crosslinking agent, a dark material with <15% reflectivity, a highly thermally conductive material that conducts greater than 50 W/m·K, a low thermal conductivity material that conducts less than 0.2 W/m·K, a magnetic or diamagnetic material; an atmospheric gas control material, an antimicrobial material, a temperature sensitive pigment, and a material with surface area greater than 100 $m^2$/g.

The inventions may include a method of manufacturing a hydrogel, including mixing a mixture of 10-40% superabsorbent polymer by dry weight, 5-25% binding agent by dry weight, 50-80% wicking agent by dry weight, <1% osmosis interfering agent by dry weight, and fully or partially dehydrating the mixture. The method may further include blending or wet milling the mixture for 30 seconds to 72 hours to accomplish the mixing step. The binding agent may be polyvinyl alcohol. The wicking agent may be cellulose. The osmosis interfering agent may be sodium chloride. The superabsorbent polymer may be sodium polyacrylate.

The method may further include heat treating the mixture, preferably performed at 200 F to 400 F for 5 to 180 minutes. The method may further include at least one cycle of freezing and thawing the mixture. The method may further include adding one or more of reflective metals or pigments, phosphors and fluorescent materials, refractive materials, dark or black materials, highly thermally conductive materials, low thermal conductivity materials, magnetic or diamagnetic materials, gas control materials, anti-microbial or disinfecting materials, temperature sensitive materials, and high surface area materials.

A method of manufacturing a hydrogel container, including mixing a mixture of 10-40% superabsorbent polymer, 5-25% binding agent, 50-80% wicking agent, <1% osmosis interfering agent by dry weight, fully or partially dehydrating the mixture, and forming the mixture into a hydrogel container.

The binding agent may be polyvinyl alcohol, the wicking agent may be cellulose, the osmosis interfering agent may be sodium chloride, and the superabsorbent polymer may be sodium polyacrylate. The method may further include blending or wet milling the mixture for 30 seconds to 72 hours to accomplish the mixing step, heat treating the mixture, preferably performed at 200 F to 400 F for 5 to 180 minutes. The method may further include encasing the hydrogel container in a water-resistant material. The method may further include adding one or more of reflective metals or pigments, phosphors and fluorescent materials, refractive materials, dark or black materials, highly thermally conductive materials, low thermal conductivity materials, magnetic or diamagnetic materials, gas control materials, anti-microbial or disinfecting materials, temperature sensitive materials, and high surface area materials.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 4 generally depicts the process for creating a refrigerated shipping package. Elements and acts in the figures are illustrated for simplicity and have not necessarily been rendered according to any particular sequence or example.

FIG. 5 generally depicts the process for creating a unique hydrogel container. Elements and acts in the figures are illustrated for simplicity and have not necessarily been rendered according to any particular sequence or example.

FIG. 6 generally depicts the data gathering devices which may be included in the inventions transmitting data from an aircraft which the inventions may be on to a phone or a computer on the ground.

FIG. 7 generally depicts the data gathering devices which may be included in the inventions transmitting data from a truck which the inventions may be on to a phone or a computer.

DETAILED DESCRIPTION

In the following detailed written description, and for the purposes of explanation, numerous specific details help provide an understanding of various aspects of the inventions. It will be understood, however, by those skilled in the relevant arts, that the present inventions may be practiced without including various specific details from particular examples. In other instances, known structures and devices may be shown or discussed more generally to avoid obscuring the inventions. In many cases, a description of the operation is sufficient to enable one to implement the various forms of the inventions. It should be noted that there are many different and alternative configurations, devices, and technologies to which the disclosed inventions may be applied or with which the inventions may be fabricated or manufactured. The full scope of the inventions is not limited to the examples that are described herein.

The technology discussed herein has many unique advantages and useful features including being available for reasonable costs and capable of shipping refrigerated products through normal shipping methods, notably not requiring expensive cold chain logistics. For example, in some cases, shippers can use the inventions and may not need to purchase gel packs or insulation. In some examples, shippers may simply use tap water for cooling. Maintaining effective cooling will enable products to avoid spoliation from temperature changes, as the inventions can maintain safe temperatures whether it is sitting in the sun or in the snow. It is envisioned that this technology will enable entire business models to become sustainable that were previously unable to do so. One skilled in the art will recognize that this technology will have a litany of other uses outside of the shipping industry as well.

Figure 1:
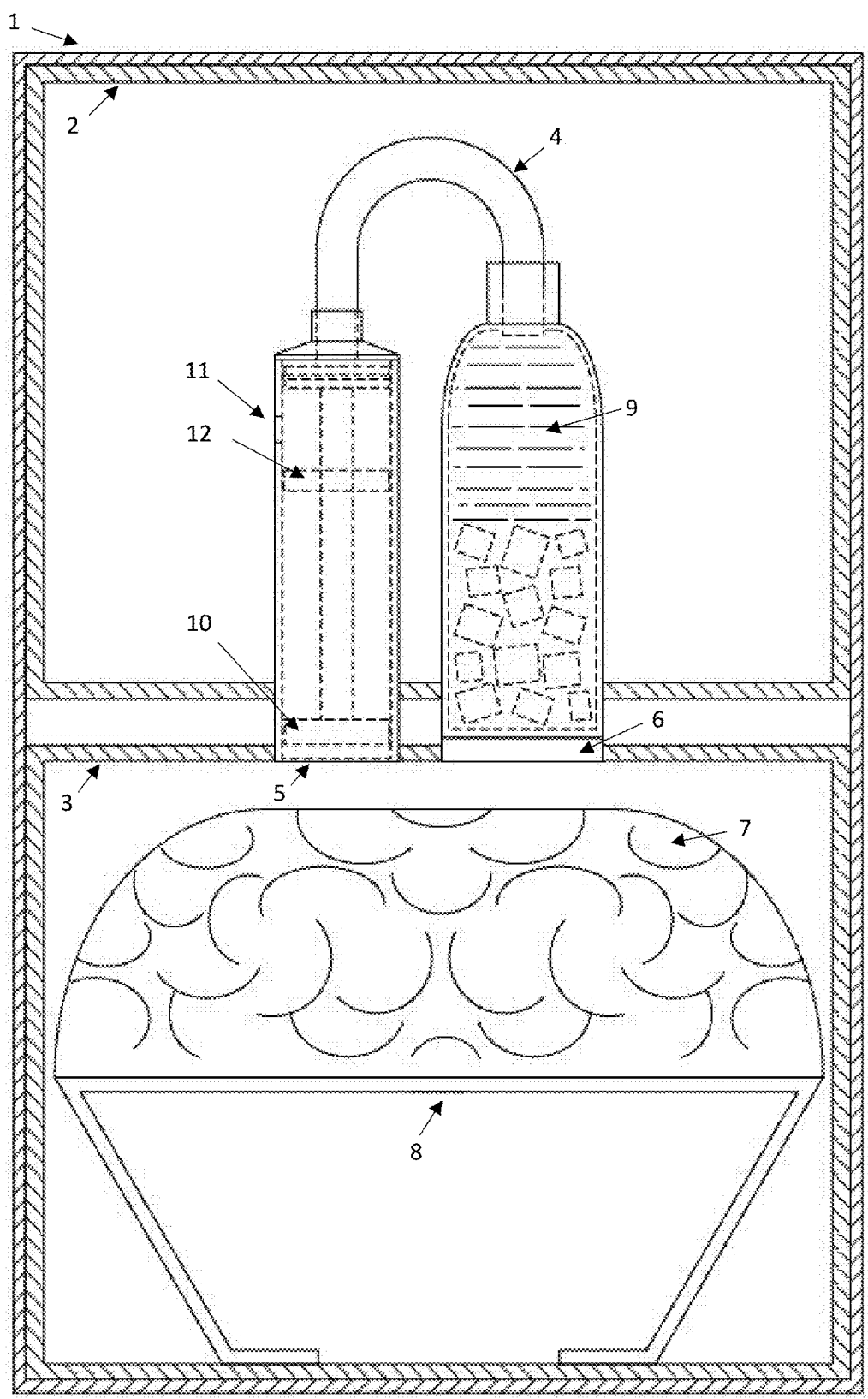
FIG. 1 generally depicts an example of the inside of the packaging system as a whole.

In one example, generally described with reference to FIG. 1, an upper box 2 and a lower box 3 are placed inside of an outer box 1. The boxes may be made from cardboard or other materials such as corrugated fiberboard, single-face board, single-wall board, double-wall board, triple-wall board, honeycomb cardboard, paperboard, grey paperboard or grey cardboard and or matboard, or other materials such as Polyethylene Terephthalate (PET or PETE), High-Density Polyethylene (HDPE), Polyvinyl Chloride (PVC or Vinyl), Low-Density Polyethylene (LDPE), Polypropylene (PP), or Polystyrene (PS).

The outer box 1 may be measured as any standard shipping box size, such as 4×4×2", 6×6×2", 8×5×3", 8×6×4", 9×8×3", 10×9×4", 14×10×4", 6×6×6", 8×8×8", 10×10×8", 12×12×6", 12×12×10", 14×14×12", 16×14×14", or 20×18×12". This list may be an example of standard shipping box sizes, however the inventions herein may be sized with any measurements desired by the shipper, shipping company, or consumer. Additionally, the upper box 2 to lower box 3 size ratio within the outer box 1 may be modified to fit the needs of the product, shipper, or consumer, but for example may consist of a ratio of 10/90, 25/75, 33/67, 40/60, 50/50, 60/40, 67/33, 75/25, 90/10, or any other ratio practicable for effective shipping and temperature control.

The lower box 3 may contain a coolant 7, for example dry ice, water ice, or other cooling substance, raised by a coolant lift 8 to be placed against a thermal conductor 6. The upper box 2 may contain a product to be shipped (for example food items) and a temperature modulator 4. The temperature modulator 4 may include salt water 9 in contact with a thermal conductor 6 (for example a metal or copper plate, or composition made of one or more of copper, silver, aluminum nitride, silicon carbine, aluminum, tungsten, graphite, or zinc or other thermally conductive material) and one or more pistons 10. When the upper box 2 requires cooling, the thermal conductor 6 of the lower box 3 is in contact with or coupled to the thermal conductor 6 of the upper box 2 creating a thermal conduit. In this position, an air hole 11 is in fluid connection or coupling with an air hole 5 allowing cold air to flow from the coolant 7 into the upper box 2. The salt water 9 may directionally freeze, raising the salinity of the unfrozen water thereby decreasing the freezing point as it further freezes. One or more pistons 10 is pushed by the expansion caused by the salt water 9 freezing. The air flow seal 12 is pushed by the movement of the piston 10 past the air hole 11, breaking the fluid connection or coupling between air hole 11 and air hole 5. In this position, the thermal conduit is broken, causing ice or other cooling agent to gradually melt and change states (e.g., to an original state of salt water 9).

The inventions may include a temperature regulating device, a modulator, by directionally freezing a saline solution to drive a piston that controls airflow between the product containing box and the coolant containing box, thermal conductivity between the saline solution and the coolant, and physical distance between the upper and lower boxes. The device may adapt to the ambient temperature keeping the contents of the package at safe temperatures between-109° F. and 45° F. regardless of the temperature outside of the box.

The temperature modulator 4 may be constructed by using an aluminum bottle, a syringe, a hose, sealant, zip ties, and an NaCl-water (or other water-soluble chemicals such as alcohols including isopropyl alcohol or ethanol or salt solutions that may alter the freezing point such as acidic salts including sodium carbonate ($NaHCO_3$) and ammonium chloride ($NH_4Cl$), basic salts including sodium acetate ($NAOOCCH_3$), potassium cyanide (KCN), and zinc chloride hydroxide (Zn(OH)Cl), neutral salts including potassium chlorate ($KClO_3$), calcium phosphate ($Ca_3(PO_4)_2$), and sodium nitrate ($NaNO_3$)) solutions. The bottle may be filled with the salt water solution. The hose may then be attached to the top of the bottle and the top of the syringe and sealed with zip ties and sealant. The one or more hoses can be constructed from rubber, plastic, or other suitable materials. The hose may be flexible. The syringe may be machined to create the airflow seal 12 and the air holes 11 and 5. The temperature modulator 4 then may be tested to ensure it is water tight. Depending on the preferred size of the temperature modulator 4, the quantity of solution, concentration of NaCl, and size of the syringe may be adjusted. These alterations may affect the freezing temperature of the NaCl solution, the amount of solution that must freeze before the temperature modulator 4 actuates, and the distance the temperature modulator 4 causes the upper box 2 and lower box 3 to move in relation to one another.

In some examples, the temperature modulator 4 may be constructed with a variety of other materials including but not limited to metal tubes, plastic tubes, metal containers, plastic containers, plastic bottles, metal bottles, or equivalents thereof, configured to utilize the force generated by the freezing of the solution in order to regulate the temperature of the upper box 2.

The inventions may additionally utilize a coolant lift 8 that allows the package to function in any orientation and to continue functioning as time passes and the coolant naturally becomes reduced in size or quantity. The coolant lift 8 may be constructed from folded expanded polystyrene (EPS) and binder clips configured to press the coolant against the thermal conductor 6. The coolant lift 8 may additionally be constructed from a variety of other materials, configured to lift at least 5 pounds of weight. One example of an alternative coolant lift 8 may be constructed with springs such as tension springs, compression springs, or torsion springs depending on the configuration of the lower box 3.

The thermal conductor 6 may be constructed using compressed aluminum foil. A variety of alternative thermal conducting materials may be used such as silver, copper, aluminum, or other materials that may have thermal conducting properties.

The upper box 2, lower box 3, and outer box 1 may be constructed with a combination of insulating and structural materials such as EPS, paper, cardboard, double-walled vacuum insulation or panels, plastic, bubble wrap, and reflective materials. The compartments may be constructed in such a way to control airflow and to insulate, while providing the structure necessary for the temperature modulation to function mechanically.

The upper box 2 and lower box 3 may be connected by compression springs to ensure the system stays aligned and may work in any orientation, as orientation cannot be assured during shipping. The compression springs used to connect the upper box 2 and lower box 3 may be able to pull at least 10 pounds of force but not exceed the force exerted by the temperature modulator 4.

The inventions may additionally provide atmospheric control as a result of directing airflow throughout the package. Depending on the chosen coolant(s), for example, the package could be filled mostly with carbon dioxide or nitrogen, protecting contents that may be sensitive to oxygen or other gasses.

The machining of the specific components and compartments may be modified in manufacturing the inventions to create different sized boxes, disposable or reusable versions or components, high efficiency or highly cost effective versions, and to meet any other desired specifications or shipping requirements. The components may be manufactured using machines configured to precisely cut, fold, and assemble materials to the required dimensions and specifications.

In FIG. 4, the inventions may be assembled by first adding a coolant to the lower box 200 and then closing it 205. Then the temperature modulator 4 may be installed in the upper box 210 along with the product that is being shipped 215, closing the upper box 220 after doing so. Third, the lower box and upper box may be placed within the outer box 225 and aligned, having the compression spring mechanism that locks them together 230. The outer box may then be sealed 235 and is ready to be shipped.

Disposal of the container upon delivery is designed to be safe and easy for the consumer. The inventions may include a thermally sensitive ink or material which is configured to indicate whether coolant is still present within the lower box 3. If it is, the consumer may place the inventions in a well ventilated area until the coolant has been used. Once no coolant remains, the entire container may be placed in a recycling bin. The inventions may be designed to be easily separable for the consumer in order to accommodate locations which require recycling to be separated by material type. A reusable version of the inventions may be constructed which requires only the addition of more coolant to return to operability, providing increased efficiency and allowing for easy and economical reuse for a variety of applications.

In some examples, an air pressure piston may be added to the coolant compartment 3. The air pressure piston may act as a fail safe to prevent explosion due to a buildup of gasses and may be used as a way to drive a piston for mechanical energy.

In some examples, a heating circuit may operate separately from or in combination with the temperature modulator 4 for additional protection against extremely cold ambient temperatures. Once the temperature modulator 4 has reached a specified actuation or once a thermometer has reached a specified temperature, the heater may be activated to warm the contents compartment and protect the products from freezing temperatures.

In some examples, air springs, foam, or a non-newtonian fluid may be added to protect the contents of the boxes from sudden kinetic events.

In some examples, a cold bank may be added to increase the duration that the system stays within a specified temperature range. The cold bank may be designed to preserve cooling that would otherwise be lost from the coolant. The cold bank may take the form of a phase-change material (PCM), high density mass such as iron, lead, or gold, or a material that accumulates phase-change material via condensation.

In some examples, the temperature modulator 4 may be designed such that upon a triggering event the fluid may drain into the coolant compartment. This may cause the rapid vaporization of the coolant to protect the consumer from potential exposure as well as creating a fog effect. The coolant lift 8 may be designed in combination with the temperature modulator 4 in alternative orientations such as sideways to maximize storage space. The lower box 3 may be installed with a locking mechanism to protect consumers from accidental exposure to the coolant.

In some examples, the piston length, tube circumference, concentration of salts, alcohols, or other freezing point altering chemicals in the solution, and quantity of solution in the body of the modulator may be adjusted. Adjustment of the foregoing parameters may adjust the temperature band that the contents compartment remains within. The temperature band may be customizable to any temperature band within the range −109 F to 45 F. The actuation distance of the piston may additionally be adjusted.

In some examples, the temperature modulator 4 may be used as a specialty piston. Utilization of stronger and thicker materials for construction of the temperature modulator 4 may allow it to act as a high force piston. The force exerted by the piston may for example fall within the range of 20,000 to 100,000 psi.

In some examples, data gathering devices may be installed including but not limited to thermocouples, thermometers, GPS trackers, time keeping devices, accelerometers, gas monitors, temperature sensitive inks or other devices, and RFID and wireless capable devices. These data gathering devices may be used in a variety of ways to protect the products and to improve the inventions. For example, the thermometer may be used as previously described to activate a heating circuit for freeze protection. With reference to FIG. 6, the current status of the package may be tracked by sending signals over a network 405, for example, the internet to an account associated with one or more package(s), sender(s), receiver(s), and/or shipper(s). The account may be accessed by phone 415, computer 410, or any other internet capable device. The network may be satellite based 425. Signals may originate from a truck 430 or an aircraft 400 and may be directed to the Earth 420, or additionally from any means of transportation on which or locations in which the inventions may be located.

With reference to FIG. 7, the currents status of the package may be tracked by sending signals over a network 715, for example, the internet to an account associated with one or more package(s), sender(s), receiver(s), and/or shipper(s). The account may be accessed by phone 710 or by computer 700. Signals may originate from a truck 705 or from any means of transportation on which or locations in which the inventions may be located.

In some examples, mechanisms of atmospheric gas control may be added to protect products that may be sensitive to humidity, oxygen, carbon dioxide, or other gasses. While the inventions as described may displace atmospheric gasses with carbon dioxide or nitrogen depending on the coolant chosen, atmospheric gas controls may be desirable for some products.

In some examples, anti-microbial mechanisms such as UV lights, silver, or disinfecting agents may be installed to protect products that may be susceptible. Liquid absorbing materials, such as sodium polyacrylate or cellulose-based absorbers, may be included to protect the product from condensation. The inventions may be modified to protect contents from large changes in air pressure, such as during a change in elevation or transportation by flight. In some examples, the temperature modulator 4 may be modified to regulate temperature in different ranges by adjusting the NaCl-water solution or the configuration of the modulator.

Figure 2:
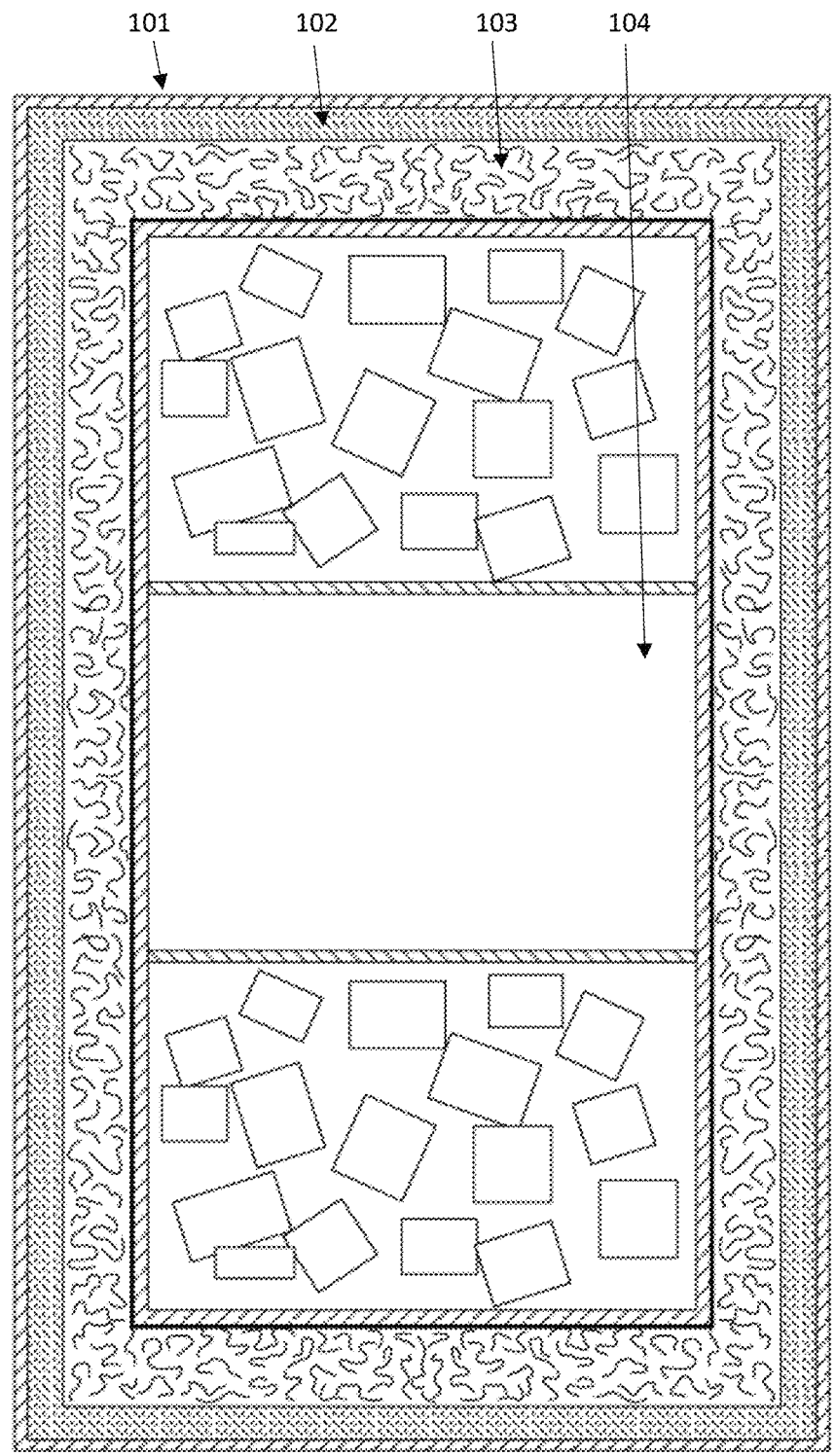
FIG. 2 generally depicts another example of a refrigerated packaging system.

With reference to FIG. 2, the inventions may additionally include a waterproof or water resistant layer or box 101 that may enclose a separation layer 102 which itself may enclose an absorbing and wicking layer 103 which in turn may enclose a product and ice compartment 104.

Figure 3:
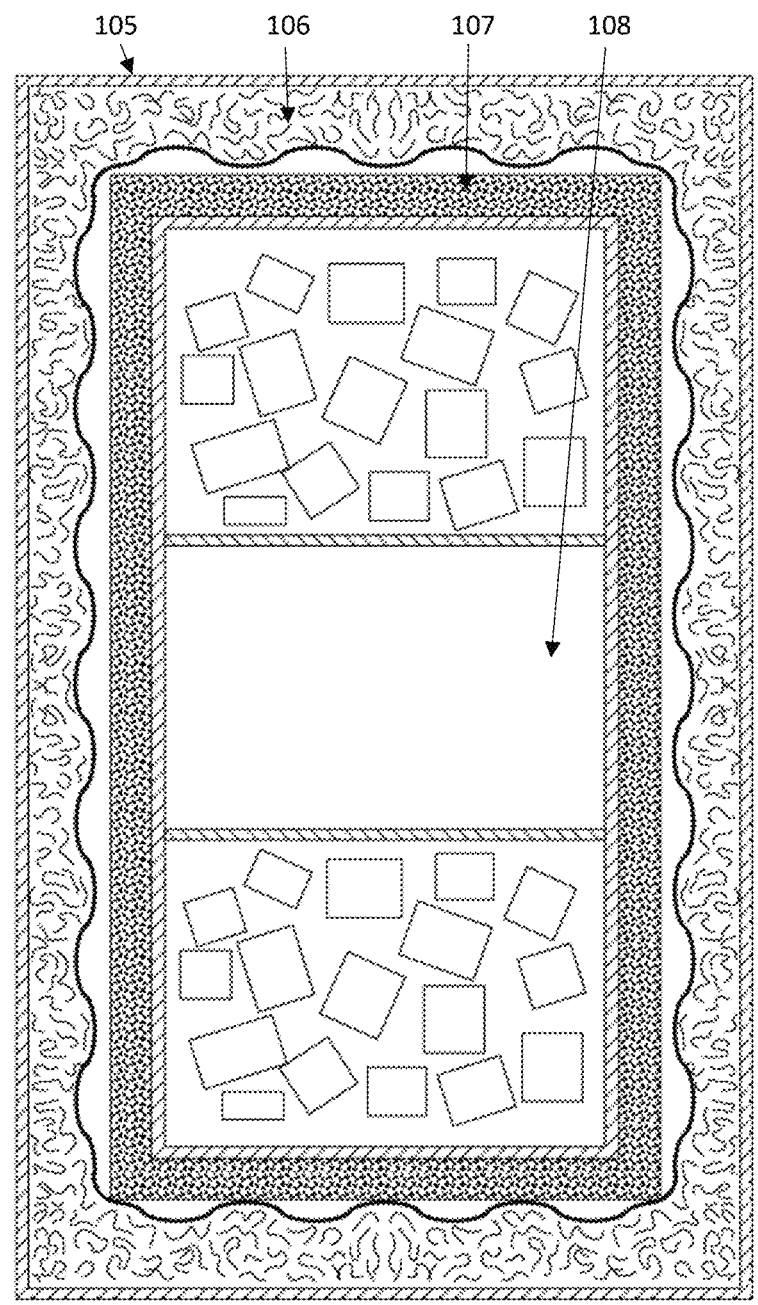
FIG. 3 generally depicts a third example of a refrigerated packaging system.

With reference to FIG. 3, the inventions may additionally include a waterproof or water resistant layer or box 105 that may enclose an absorbing and wicking layer 106 which itself may enclose a separation layer 107 which in turn may enclose a product and ice compartment 108.

The inventions may allow for water and/or ice to be utilized as a primary coolant. As ice melts, the water may be wicked away by the absorbing and wicking layer 103 on all sides, preventing water from leaking out of the package. In the absorbing and wicking layer 103, water may be absorbed by a hydrogel which is capable of absorbing 10-300 times its weight in water and expanding in the process. This may provide additional insulation to the package offering both thermal and kinetic protection. The wicking may be accomplished via a capillary effect.

Specialized hydrogels may instantly absorb water up to its maximum capacity and may not take time to affect the absorption. Hydrogels may chemically lock water, meaning water cannot be extracted physically from hydrogels. Hydrogels may be firm and hard when dry, and may transform into a non-Newtonian fluid when wet. Hydrogels may retain their structure in the non-Newtonian form, and may not disintegrate or fall apart. Hydrogels additionally may have high surface area and may be formulated in a way that releases water at the rate of evaporation, maximizing evaporation while preventing it from leaking liquid water or transferring water to other surrounding substances.

The separation layer 102 may be configured to create one or more small gaps between the outside box 101 and the absorbing and wicking layer 103. Separation layer 102 may provide additional protection from the outer box 101 becoming moist and may ensure structural integrity to stay within regulations of major delivery services. Separation layer 102 may be configured to support the weight of the hydrogels attached to it, and in some examples may not inhibit convection for purposes of evaporative cooling. For example, the separation layer may be a waterproof boundary such as plastic which may be more widely accessible but may not provide evaporative benefits. In another example, the separation layer may be a wicking foam-like material which may maximize evaporation and provide additional benefits. The separation layer may also act as an insulation layer.

In some examples, liquid water created by melting may provide additional temperature regulation properties. For example, water absorbed by hydrogels can evaporate if ambient temperatures are above freezing, which may lead to longer durations at refrigerated temperatures due to the effect of evaporative cooling. Water absorbed by hydrogels may freeze prior to the central contents compartment 104 if ambient temperatures are below freezing, releasing latent heat and keeping the contents of the contents compartment 104 above freezing temperatures.

A water absorber that can be used in hydrogels may be a modified and specialized unique sodium polyacrylate formulation. Typical sodium polyacrylate tends to become more dense as water evaporates thereby making further evaporation limited or difficult. To counteract this, a specific amount of an osmosis interfering agent, such as salt, may be added to the hydrogel. As the hydrogel absorbs water, the salinity concentration may decrease, allowing the hydrogel to further absorb water. As the hydrogel evaporates water, the salinity concentration may increase, which may allow the gel to release more water. The addition of specific amounts of salinity to sodium polyacrylate changes the absorb-desorb curves from exponential to linear as the two chemicals counteract each other. In other examples, hydrogels may include a combination of polyvinyl alcohol, cellulose, and other additives as well as having a method of crosslinking or crystallizing the mixture.

In FIG. 5, hydrogels may be made from a combination of ingredients and processes to target specific desirable properties. The ratio of ingredients, the processes of manufacture, and the additives may be changed or modified for various applications. Hydrogels may be made from a mixing of 10-40% by dry weight, sodium polyacrylate 305, 5-25% by dry weight, polyvinyl alcohol 310 which may be 99% hydrolyzed, 50-80% by dry weight, cellulose 315, <1% by dry weight, sodium chloride 320. Additional additives may be included 325 to target specific desirable properties. The sodium polyacrylate may be substituted for any material which absorbs a large ratio of water through osmosis or other absorption or adsorption mechanisms, such as polyacrylamide, chitosan, or starch-based polymers. The polyvinyl alcohol may be substituted for any water-soluble binding agent, such as polyvinyl acetate, cellulose ethers, or agar. The cellulose may be substituted for any wicking agent, such as polyester, nylon, or polypropylene. The sodium chloride may be substituted for any chemical which interferes with the process of osmosis, such as other salts or desiccants. The mixture may be mixed, blended, or wet milled for a period of time between 30 seconds and 72 hours 330. Water may be added to facilitate this process. After blending, the mixture may be dried or dehydrated. The mixture may then be heat treated between 200 F and 400 F for a period of time between 5 minutes and 180 minutes 335. The heat treated mixture may then be shaped into a container 340. Holes or pores may be added 345 to facilitate air exchange between the inside of the hydrogel container and the outside of the hydrogel container. The hydrogel container may be surrounded by a water-proof material or a wicking material 350. The internal space may be filled with water and/or ice and products to be kept cold. The container may be shaped such that a user may simply add the products, add ice, and then close the container, similar to a regular cooler one may use.

In another example, the hydrogels may be composed of 60-95% sodium polyacrylate, 2-25% polyvinyl alcohol, polyvinyl acetate, or a mixture of polyvinyl alcohol and polyvinyl acetate, 1-5% cellulose by dry weight, and 0.02-0.1% an osmosis interfering agent by dry weight.

In another example, hydrogels may be processed together by using lasers or other methods of precision energy application to dehydrate, heat, cure, or cut hydrogels with desired characteristics or shapes. In another example, a CNC laser may be used to apply quick on-off bursts of laser radiation to stimulate rapid heat-cool cycles for desired surface characteristics.

Hydrogels may be fabricated to avoid the use of hazardous materials when possible or when preferred, and can simply be thrown away by the consumer with no further action required. Alternatively, in certain cases, potentially hazardous hydrogels may be preferred and would typically utilize alternative disposal processes. A reusable hydrogel may be created by using distilled water or by including an additive or filter that removes dissolved minerals as well as an additive with anti-microbial properties such as silver.

The hydrogel container may be modified to fit common applications. For example, the hydrogel container may be encased in a water-proof material so that it may be placed inside or near materials that would otherwise degrade when they become wet, such as cardboard often used in shipping containers. Hydrogels are very moldable and may for example take the shape of a shipping container, a bag, a pouch, or any other container which may be used to carry products.

In some examples, the hydrogel container may be shipped in a box that facilitates evaporation primarily through airflow. An example of a box that facilitates evaporation primarily through airflow may be a plastic box with a plurality of holes in it. The plurality of holes may be as many holes as the box may support without losing structural integrity. The plurality of holes may be arranged randomly, in a grate-like pattern, in a pattern such as that used in layered corrugated cardboard, or other patterns that may allow a plurality of holes to promote airflow without compromising structural integrity. The box may be constructed such that points of contact with other surfaces are waterproof to prevent water transfer.

In some examples, reflective metals or reflective pigments may be added to the hydrogel formulation to reduce thermal radiation. Phosphors and fluorescent materials may be added to the hydrogel formulation to store radiation without conversion to heat, to emit light at a specific frequency that provides advantageous thermal properties, or for illumination. Refractive materials may be added to the hydrogel formulation that may manipulate radiation in a useful manner.

In some examples, dark or black materials which absorb high amounts of radiation, such as black pigments, may be added to the hydrogel formulation to facilitate rapid drying. Highly thermally conductive materials (conductivity greater than 50 W/m·K), such as copper, aluminum, silver, or graphite may be added to the hydrogel formulation to facilitate rapid drying. Low thermal conductivity materials (conductivity less than 0.2 W/m·K), such as foams, may be added to the hydrogel formulation to increase the insulating properties of hydrogels. Low thermal conductivity materials such as a layer of insulation material may be used in combination with the hydrogel.

In some examples, materials that may facilitate the process of condensation may be added to the hydrogel formulation. These materials may be hydrophilic, have a high surface area, or may include a micro or nano structure that influences air pressure and volume. Magnetic or diamagnetic materials may be added to the hydrogel formulation to allow hydrogels to be influenced by magnetic fields.

In some examples, gas control materials may be added to the hydrogel formulation that alter atmospheric gas content, such as to reduce humidity or oxygen. Anti-microbial or disinfectant materials may be added to the hydrogel formulation to inhibit the growth of microbes. Temperature sensitive pigments may be added to the hydrogel formulation to indicate when coolant remains. High surface area materials such as activated carbon, foam, MOFs, or zeolite may be added to the hydrogel formulation to facilitate rapid evaporation. Additives that help break down non-biodegradable ingredients of hydrogels may be added.

Hydrogels may further have a number of modifications or additional features that may be added for extra functionality. In some examples, hydrogels may be manufactured to have a foam-like structure to increase insulative effects and surface area. Foam-making methods may include freeze drying, freeze-thaw cycles, microwave dehydration, or mechanical agitation in combination with surfactants or proteins. Hydrogels may be manufactured in a way so as to facilitate condensation for the purpose of gathering phase-change materials out of the air, such as by adding high surface area or high thermal conductive material. The formulation of the hydrogels may be processed together in a way so as to form fiber-like material that has a number of desirable characteristics and applications. Fiber-making methods may include electrospinning to form threads with nanoscale diameters, or propelling a stream of the mixture through fluids while undergoing physical or chemical changes to retain its shape.

In some examples, the formulation of the hydrogels may be wet-milled and filtered until each molecule chain is shorter than 1 micron. The solution may then be passed through a machine that produces droplets via ultrasonic propulsion, conventional spraying mechanisms, or agitation with a hydrophobic material at low pressure. The droplets may then pass through a fluid that may be controlled in a way so as to produce standalone microspheres, of desired granularity, or to form a structure of interconnected spheres.

Mechanical or ionic fans, compressed air, or other methods of air movement may be added to the container to improve evaporation rates. LED or other devices capable of emitting light at specific frequencies may be added to the container to improve evaporation rates.

In other examples of the inventions, a method of transforming the hydrogel mixture into superabsorbent nanosponges of interconnected spheres smaller than 1 micron may be incorporated into the inventions. Additionally, a method of crosslinking one or more ingredients may be used to dramatically improve the mechanical, thermal stability, dimensional stability, film-forming, swelling, and chemical resistance properties.

In some examples, hydrogels may be manufactured into desired shapes or structures using the same methods used by CNC 3D printing machines.

In some examples, an electrical circuit may be added to vaporize water to either rapidly dry hydrogels or to vaporize water in a way that facilitates air exchange without the addition of heat. Adsorbing materials, such as silica gel, dehumidifying machines, or other methods of dehumidification may be added to increase evaporation rates. A vacuum pump or other means of lowering air pressure may be added to increase evaporation rates.

In some examples, a foam-like material with wicking capabilities may be added to the system to facilitate evaporation and to provide insulation. Plant seeds may be added to the container, which may sprout and grow leading to faster evaporation through biological processes as well as may provide insulation. Data gathering devices may be installed, including but not limited to thermometers, GPS tracking devices, time keeping devices, accelerometers, gas monitors, temperature sensitive inks or other devices, and RFID and wireless capable devices. The container may be modified to protect contents from changes in air pressure by elevation or transportation by flight 400.

There may be additional applications of hydrogel technology as described. For example, hydrogels may be used in agriculture as a form of self-watering plant growth. Water consumption may be reduced and plants may be grown in a variety of nontraditional orientations or locations. Hydrogels may be further modified into mycology substrates. Hydrogels may be used to cool structures. Hydrogels may provide passive cooling by absorbing and evaporating rain or condensation. Low-energy active cooling when combined with a supply of water may be achieved. For example, hydrogels may be used in evaporative coolers or as part of a liquid cooling system used to cool machines that generate excessive amounts of heat, or to cool commercial structures containing machines that generate excessive heat, such as data centers, manufacturing plants, and power plants. The hydrogels may be used in any cooling application with a goal of cooling to the ambient wet bulb temperature.

In some examples, hydrogels may have home and beauty applications. Hydrogels may be used as a rapid construction material in environments which may be expected to remain below freezing temperatures by hydrating the hydrogels and allowing them to freeze in the desired place. Hydrogels may be used as a wood-like construction material that may be malleable when wet and may be rigid when dry. Hydrogels may be modified for skin hydration therapies or may be used for cushioning, such as for a safer waterbed alternative. Hydrogels may have athletic, medical, or work applications. Hydrogels may be used in cooling wear, weighted vests, sweat absorbers, in treating hyperthermia or sunburns. Hydrogels may be modified to absorb solvents, oils, or hazardous materials. Hydrogels may have a range of miscellaneous applications such as water filtration, no-power humidifiers, diapers, or door and floor mats. Hydrogels may have applications wherever condensation is problematic. Hydrogels may be used as a rapid self sealing water gate.

The inventions present massive improvements in cost efficiency for refrigerated shipping to consumers. For example, shipping boxes might be manufactured at low or reasonable costs, allow businesses to bypass cold chain logistics or gel ice pack shipping, and can provide more efficient cooling reducing box size and weight which can translate into lower shipping costs. The inventions provide unexpected advances that combat the long-felt difficulties encountered in temperature regulated shipping.

The inventions may additionally ensure food and drug safety when shipping directly to consumers. Prior to the inventions, an array of different grocery and meal preparation companies were tested. None of the tested orders arrived below 45° F., the maximum recommended temperature for food safety. The shipped boxes were unable to keep food items below the recommended temperature for the 2-3 days of shipping time, and local grocery deliveries were similarly unable to keep food items below the recommended temperature for 1-4 hours.

The inventions may additionally reduce waste generated by traditional cold chain logistics. Weight, size, and spoilage of packages can be reduced, thereby decreasing the environmental impact of refrigerated shipping. In some examples, water and ice can be used to cool products. In some examples, boxes can be made from 100% recyclable materials and can be made from 100% recycled materials.

I claim:

1. A method of manufacturing a hydrogel container, comprising;
   mixing a mixture of 10-40% superabsorbent polymer, 5-25% binding agent, 50-80% wicking agent, about 0.02% to about 1% osmosis interfering agent by dry weight, wherein the mixing includes blending or wet milling the mixture for 30 seconds to 72 hours to accomplish the mixing;
   fully or partially dehydrating the mixture to create a fully or substantially dehydrated mixture;
   heat treating the dehydrated mixture at 200 F to 400 F for 5 to 180 minutes;
   forming the dehydrated mixture into a hydrogel container; and
   encasing the hydrogel container in a water-resistant solid material.

2. The method of manufacturing a hydrogel container of claim 1, wherein the binding agent comprises polyvinyl alcohol, the wicking agent comprises cellulose, the osmosis interfering agent comprises sodium chloride, and the superabsorbent polymer comprises sodium polyacrylate.

3. The method of manufacturing a hydrogel container of claim 1, further comprising:
   adding
   a material with surface area greater than 100 m²/g.

4. The method of manufacturing a hydrogel container of claim 3, further comprising:
   adding, as a coating to the hydrogel container after it's formed, a phosphor material that emits light at wavelengths between 500-565 nanometers.

5. The method of manufacturing a hydrogel container of claim 4, further comprising:
   adding, as one or both part of the mixture and/or as a coating to the hydrogel container after it's formed, a fluorescent material that emits light at wavelengths between 500-565 nanometers.

6. The method of manufacturing a hydrogel container of claim 4, further comprising:
   adding, as a coating to the hydrogel container after it's formed, reflective metals or pigments.

7. The method of manufacturing a hydrogel container of claim 4, further comprising:
   adding, as a coating to the hydrogel container after it's formed, a refractive material with >90% refractivity.

8. The method of manufacturing a hydrogel container of claim 4, wherein the binding agent comprises polyvinyl alcohol, the wicking agent comprises cellulose, and the superabsorbent polymer comprises sodium polyacrylate.

9. The method of manufacturing a hydrogel container of claim 3, further comprising:
   adding, as one or both part of the mixture and/or as a coating to the hydrogel container after it's formed, a fluorescent material that emits light at wavelengths between 500-565 nanometers.

10. The method of manufacturing a hydrogel container of claim 9, further comprising:
    adding, as a coating to the hydrogel container after it's formed, a refractive material with >90% refractivity.

11. The method of manufacturing a hydrogel container of claim 3, further comprising:
    adding, as a coating to the hydrogel container after it's formed, reflective metals or pigments.

12. The method of manufacturing a hydrogel container of claim 3, further comprising:
    adding, as a coating to the hydrogel container after it's formed, a refractive material with >90% refractivity.

13. The method of manufacturing a hydrogel container of claim 3, wherein the binding agent comprises polyvinyl alcohol, the wicking agent comprises cellulose, and the superabsorbent polymer comprises sodium polyacrylate.

14. The method of manufacturing a hydrogel container of claim 1, further comprising:
    adding, as one or both part of the mixture and/or as a coating to the hydrogel container after it's formed, a phosphor material that emits light at wavelengths between 500-565 nanometers.

15. The method of manufacturing a hydrogel container of claim 1, further comprising:
    adding, as one or both part of the mixture and/or as a coating to the hydrogel container after it's formed, a fluorescent material that emits light at wavelengths between 500-565 nanometers.

16. The method of manufacturing a hydrogel container of claim 1, further comprising:
    adding, as a coating to the hydrogel container after it's formed, reflective metals or pigments.

17. The method of manufacturing a hydrogel container of claim 1, further comprising:
    adding, as a coating to the hydrogel container after it's formed, a refractive material with >90% refractivity.

18. The method of manufacturing a hydrogel container of claim 1, wherein the hydrogel container comprises an absorbing layer, a wicking layer, and a coolant consisting of water ($H_2O$) ice, which melts and is wicked away by the absorbing and wicking layer on all sides, preventing water from leaking out of the package; and wherein water absorbed by the hydrogel container evaporates when ambient temperatures are above freezing to thereby provide evaporative cooling, such that time of refrigeration is extended beyond duration of refrigeration of ice melt alone, absent the evaporative cooling.

19. The method of manufacturing a hydrogel container of claim 1, wherein the hydrogel container comprises an absorbing layer, a wicking layer, a central contents compartment, and a coolant consisting of water ($H_2O$) ice, which melts and is wicked away by the absorbing and wicking layer on all sides, preventing water from leaking out of the package; and wherein water absorbed by the hydrogel freezes prior to the central contents compartment if ambient temperatures are below freezing, releasing latent heat and keeping of the contents compartment above freezing temperatures for a duration of time longer than would be provided by an equivalent amount of insulation.

20. The method of manufacturing a hydrogel container of claim 19, wherein water absorbed by the hydrogel container evaporates when ambient temperatures are above freezing to thereby provide evaporative cooling, such that time of refrigeration is extended beyond duration of refrigeration of ice melt alone, absent the evaporative cooling.

\* \* \* \* \*